(12) United States Patent
Helt et al.

(10) Patent No.: US 7,600,694 B2
(45) Date of Patent: Oct. 13, 2009

(54) MULTIPLE THERMOSTATS FOR AIR CONDITIONING SYSTEM WITH TIME SETTING FEATURE

(75) Inventors: Robert W. Helt, Tyler, TX (US); Gordon Jeffrey Hugghins, Jacksonville, TX (US); Carl L. Garrett, Bullard, TX (US)

(73) Assignee: Trane International Inc., Piscataway, NJ (US)

( * ) Notice: Subject to any disclaimer, the term of this patent is extended or adjusted under 35 U.S.C. 154(b) by 785 days.

(21) Appl. No.: 10/765,634

(22) Filed: Jan. 27, 2004

(65) Prior Publication Data

US 2005/0161517 A1    Jul. 28, 2005

(51) Int. Cl.
*F24D 19/10* (2006.01)
*G05D 23/00* (2006.01)
*B64D 13/00* (2006.01)
*F24F 3/00* (2006.01)
*G01M 1/38* (2006.01)

(52) U.S. Cl. .................. 236/1 B; 236/51; 236/91 D; 165/205; 700/278

(58) Field of Classification Search ............... 236/1 B, 236/1 C, 94, 51, 46 R; 165/208, 205–221; 700/276, 277
See application file for complete search history.

(56) References Cited

U.S. PATENT DOCUMENTS

| 4,530,395 A | 7/1985 | Parker et al. |
| 4,843,084 A * | 6/1989 | Parker et al. ................. 700/277 |
| 4,931,948 A | 6/1990 | Parket et al. |
| 5,160,853 A | 11/1992 | Simon et al. |
| 5,181,653 A * | 1/1993 | Foster et al. ................ 236/49.3 |
| 5,197,668 A | 3/1993 | Ratz et al. |
| 5,203,497 A | 4/1993 | Ratz et al. |
| 5,326,027 A | 7/1994 | Sulfstede |
| 5,348,078 A * | 9/1994 | Dushane et al. ............. 165/209 |
| 5,385,297 A | 1/1995 | Rein et al. |
| 5,419,489 A | 5/1995 | Burd |
| 5,566,879 A * | 10/1996 | Longtin ..................... 236/46 R |
| 5,833,134 A * | 11/1998 | Ho et al. ..................... 236/49.3 |
| 6,351,693 B1 | 2/2002 | Monie et al. |
| 6,394,359 B1 * | 5/2002 | Morgan ....................... 236/51 |
| 2003/0050737 A1 * | 3/2003 | Osann, Jr. ................... 700/276 |

* cited by examiner

*Primary Examiner*—Chen-Wen Jiang
(74) *Attorney, Agent, or Firm*—Conley Rose, P.C.; J. Robert Brown, Jr.

(57) ABSTRACT

An air conditioning (HVAC) system for a residential dwelling or other building with enclosed spaces includes multiple thermostats hard wire interconnected or communicating via radio frequency transceivers. The thermostats each include control circuits for adjusting the setpoint temperature at any one thermostat and displaying the set temperature at all thermostats, setting the time at any one thermostat and displaying the time at all thermostats, controlling the thermostat temperature setting from a selected one of the thermostats and providing a setpoint for control of the air conditioning system based on an average temperature sensed by all of the thermostats. A method for correctly setting a thermostat time display to one of Daylight Saving Time or Standard Time and displaying an icon identifying one or the other is disclosed.

22 Claims, 5 Drawing Sheets

MULTIPLE THERMOSTATS FOR AIR CONDITIONING SYSTEM WITH TIME SETTING FEATURE

BACKGROUND OF THE INVENTION

Conventional air conditioning systems, often referred to as heating, ventilating and air conditioning (HVAC) systems for residential dwellings and other installations typically utilize one thermostat for controlling the temperature in the entire controlled space. For example, in a residential dwelling the thermostat is normally located centrally, such as in an interior hallway. However, various rooms throughout the dwelling, such as the kitchen, upstairs bedrooms in two-story homes, or rooms in which a more appreciable heating or cooling load is occurring may not be properly controlled to produce a comfortable temperature for the occupants.

It is desirable to be able to determine the temperature in various locations within a residential dwelling or other enclosed space which may be divided into several zones or rooms and conditioned by a single air conditioning unit. Still further, it has been deemed desirable to be able to control the temperature at a particular area or in a particular room in a controlled interior space and to control the HVAC system to provide an average temperature based on sensing temperatures at several locations within the controlled space, such as various rooms within a residential dwelling unit.

Another problem associated with thermostats which are programmable to change the temperature setting at various times of the day relates to changing from Standard Time to Daylight Saving Time and resetting the thermostat to operate from and to show the correct time setting on a visual display of the thermostat.

It is to overcome the disadvantages of prior art systems and to meet the desiderata mentioned above and otherwise herein that the present invention has been developed.

SUMMARY OF THE INVENTION

The present invention provides an HVAC system which includes improved control using multiple thermostats located in various portions of an enclosed space such as various rooms of a residential dwelling or other building.

In accordance with one aspect of the present invention an air conditioning system is provided which includes multiple thermostats for controlling a single air conditioning unit wherein the thermostats are disposed in various locations, such as different rooms within the space controlled by the air conditioning unit, and wherein the thermostats communicate with each other and with the system to provide a temperature setpoint for the system which may be controlled from each of the thermostats and the multiple thermostats each display a temperature setting and the actual temperature at each of the thermostats.

In accordance with another aspect of the present invention an air conditioning system is provided with multiple thermostats for controlling a single air conditioning unit wherein the temperatures sensed at each of the multiple thermostats is averaged and the average temperature is used as the setpoint or target temperature for the system to achieve. Still further, the multiple thermostat arrangement is configured such that the temperature setting at all of the thermostats may be changed in accordance with the setting at a selected one of the thermostats.

Still further, the present invention provides an air conditioning system with multiple thermostats wherein the thermostats may be interconnected by electrical conductors or may communicate with each other by so called wireless or radio frequency communication. The system provides for multiple thermostats with each thermostat displaying system operation and wherein each thermostat may be controlled to change the system temperature setting. In this way the user of the system may control the system temperature setpoint from any one of the multiple thermostats whereby the setting of the temperature will be displayed on all thermostats. The user may set a clock on any one of the thermostats and the clock setting will be in accordance with and displayed on all thermostats. Still further, a "control from here" feature allows the selected thermostat to sense the indoor temperature at that location and control the system in accordance with the temperature in the space at which the selected thermostat is disposed.

The present invention still further provides improved methods for operating an air conditioning system including a method for setting a thermostat to display the time and to display an icon correctly indicating whether the displayed time is Standard Time or Daylight Saving Time.

Those skilled in the art will further appreciate the above-mentioned features and advantages of the invention together with other important aspects thereof upon reading the detailed description which follows in conjunction with the drawings.

DETAILED DESCRIPTION OF PREFERRED EMBODIMENTS

Figure 1:
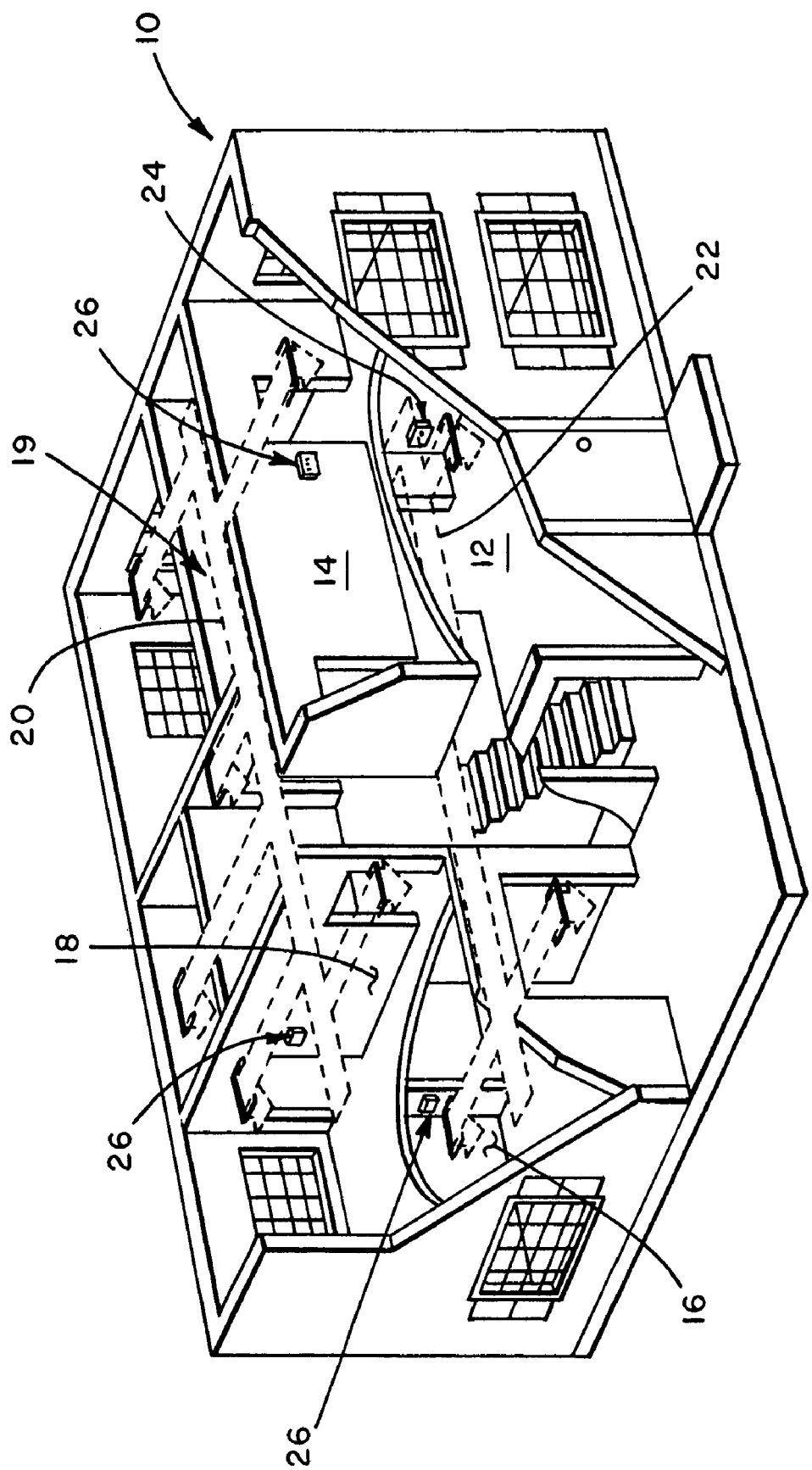
FIG. 1 is a somewhat schematic illustration of a typical two-story residential dwelling unit including a multiple thermostat controlled air conditioning system in accordance with the invention.

In the description which follows, like elements are marked throughout the specification and drawings with the same reference numerals, respectively. The drawing figures are in schematic, block diagram or generalized form in the interest of clarity and conciseness.

Referring to FIG. 1, there is illustrated a cut-away of a multi-room, two-story conventional residential dwelling 10 divided into multiple interior spaces or rooms 12, 14, 16 and 18, for example. The dwelling 10 is air conditioned by a suitable system 19, herein referred to as an air conditioning or HVAC system and operable to heat or cool, or both, air supplied to or recirculated to a space. System 19 distributes conditioned air via distribution ducts 20 and 22, shown somewhat schematically. At least the rooms 12, 14, 16 and 18 are provided with programmable thermostats, including a thermostat 24 in room 12 and substantially identical thermostats 26 disposed in rooms 14, 16, and 18, respectively, as shown. Thermostat 24 may be considered to some extent a master unit since it is located in a room, such as room 12, which may be a primary living space. Room 16, for example, may be a kitchen space and rooms 14 and 18 may be bedrooms or one of these rooms may be a workshop or studio, for example.

The temperatures within the rooms 12, 14, 16 and 18 may vary somewhat due to heating or cooling loads imposed on the rooms. For example, if room 16 is a kitchen at various times of the day the room would tend to be warmer due to activities which would generate heat. Movement of the sun or exposure to exterior air currents may tend to heat or cool rooms unevenly. Of course, it would be desirable to be able to set the temperature in any one of the rooms of the dwelling unit 10 having a thermostat 24 or 26 to achieve the level of comfort desired for that room. Alternatively, it is desirable to maintain a somewhat uniform temperature throughout the dwelling unit 10 by averaging the temperatures sensed by the thermostats 24 and 26 and control the HVAC unit accordingly. Still further, it is desirable to set a clock associated with each of the thermostats 24 and 26 from any one of them and have the clock setting corrected on all thermostats.

Figure 2:
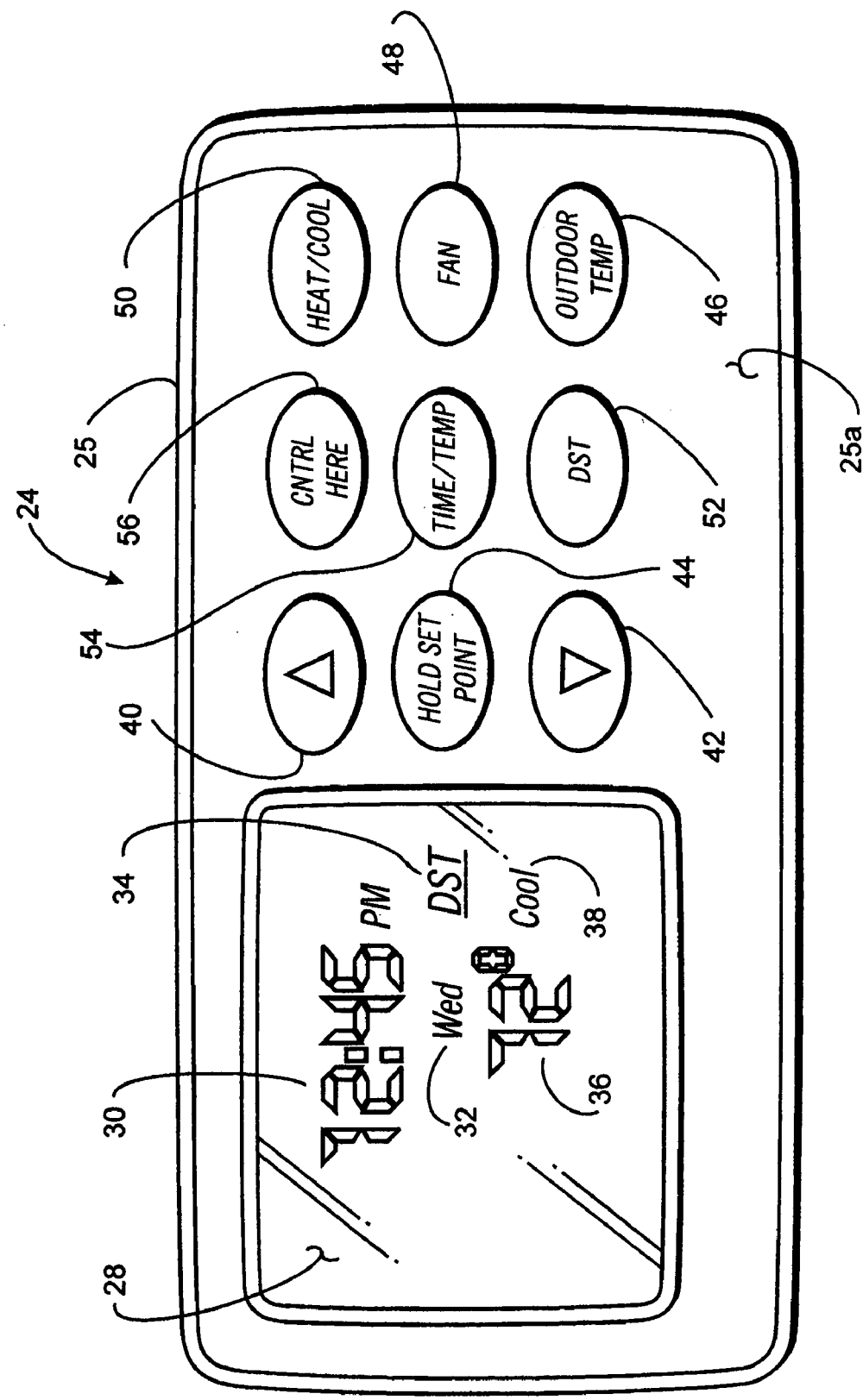
FIG. 2 is a front elevation of a thermostat showing a visual display and an arrangement of push button type "keys" or control switch actuators and of a type which may be used with a multiple thermostat-controlled air conditioning system of the present invention.

Referring briefly to FIG. 2, there is illustrated the face of the thermostat 24. The faces of thermostats 26 may be identical to that shown. Thermostat 24 includes a suitable housing 25 having a front face 25a which includes a visual display 28 including digits 30 indicating time, the day of the week 32, and an icon 34 indicating whether or not the time displayed is Daylight Saving Time or Standard Time. Accordingly, if the icon "DST" is displayed this would indicate that the displayed time is Daylight Saving Time. In the absence of the icon "DST" this would indicate the time showing is Standard Time. Still further, the actual temperature sensed by the thermostat 24 is displayed at 36. An indicator 38 indicates if the air conditioning or HVAC unit is operating in heating mode or cooling mode.

Referring still further to FIG. 2, the exemplary thermostat 24 includes switch actuators 40 and 42 for setting the temperature setpoint up or down. A switch actuator 44 may be used to hold the setpoint of the thermostat and override any programmable features, such as temperature set back features which vary the temperature setpoint in accordance with the time of day. Additional switch actuators for the thermostat 24 include an outdoor temperature actuator 46 which, when actuated, will temporarily display outdoor temperature at 36. A switch actuator 48 is operable to control a fan of the HVAC unit independent of automatic operation. A switch actuator 50 is operable to set the operating mode of the HVAC unit, such as heating or cooling.

Still further, the exemplary thermostat 24 includes a switch actuator 52 which may automatically set the clock of the thermostat 24 forward one hour for Daylight Saving Time or, when actuated when the icon 34 is showing, the actuator 52 will set the clock back one hour. The setting mode of the thermostat 24 may be controlled by a switch actuator 54. For example, when setting the correct time, the switch actuator 54 may be actuated to put the control circuitry for the thermostat 24 in the time setting mode whereupon actuation of the switch actuators 40 and/or 42 may be carried out to set minutes and hours, respectively, for example. Various other time and day setting sequences may be utilized including sequences of actuating the switch actuators to program the thermostat for selective set back conditions, for example. Alternatively, a separate switch actuator may be provided for putting a microcontroller for thermostat 24 in a mode for setting the clock function.

Referring still further to FIG. 2, the face 25a of the thermostat 24 further includes a switch actuator 56 identified as comprising a "Control Here" function setting, when actuated. Actuation of push button switch actuator 56 will cause the HVAC system 19 of the present invention to be controlled from the particular thermostat at which the switch actuator 56 is disposed, thus overriding the settings of any of the other thermostats in the multiple-thermostat arrangement for the HVAC system. When a switch actuator 56 is actuated the associated thermostat becomes the so called master and other thermostats of the system are essentially slaved thereto. The term "Control Here" is used for convenience herein. Thus, the system of the invention includes a multiple thermostat arrangement having a changeable master/slave relationship between thermostats.

The arrangement of push button type switch actuators or "keys" shown in FIG. 2 and described hereinabove is exemplary. Different arrangements of switch actuators or keys may be utilized in accordance with the system and methodology of the invention as well as sequences of operating respective switch actuators to accomplish the processes of the invention.

Figure 3:
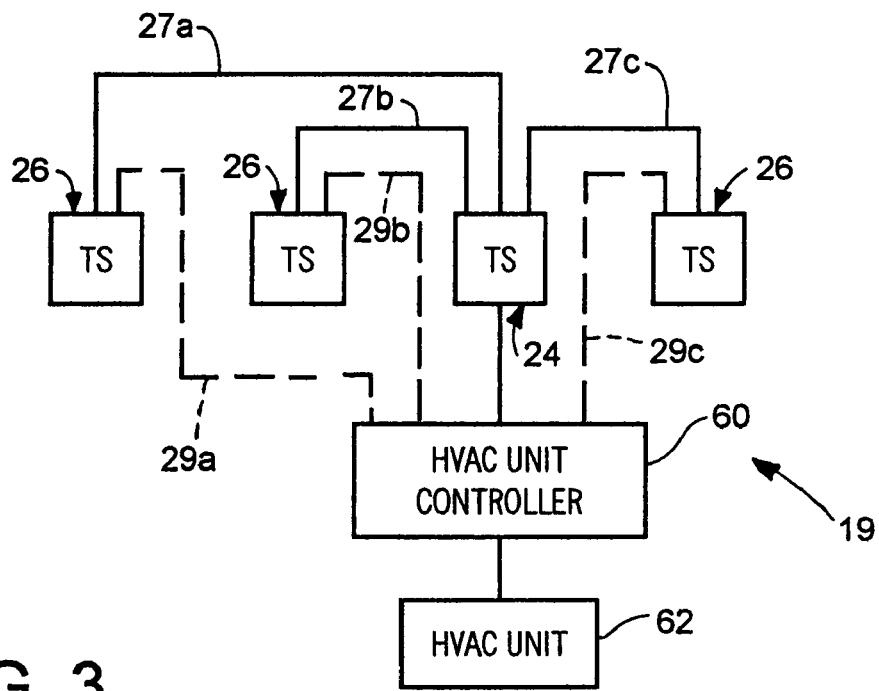
FIG. 3 is a schematic diagram of an HVAC system with multiple thermostats which are hard wired to a master thermostat and an air conditioning unit controller.

Referring now to FIG. 3, there is illustrated a block diagram illustrating the HVAC system 19 and how the thermostats 24 and 26 are interconnected to each other and to an air conditioning or HVAC unit controller 60 for controlling an air conditioning or HVAC unit 62. The controller 60 may be of a conventional type for receiving command signals from the respective thermostats directly or via the thermostat 24, depending on the configuration of the circuitry in the thermostats 24 and 26. For example, any temperature settings made at any one of the thermostats 24 and 26 may be transmitted to the thermostat 24 for controlling the HVAC unit via the controller 60. Alternatively, any one of the thermostats 24 and 26 may, when placed in the "Control Here" mode of operation, communicate directly with the controller 60 for operation of the HVAC unit 62 to meet the temperature demands of the thermostat which is in the "Control Here" mode.

Figure 4:
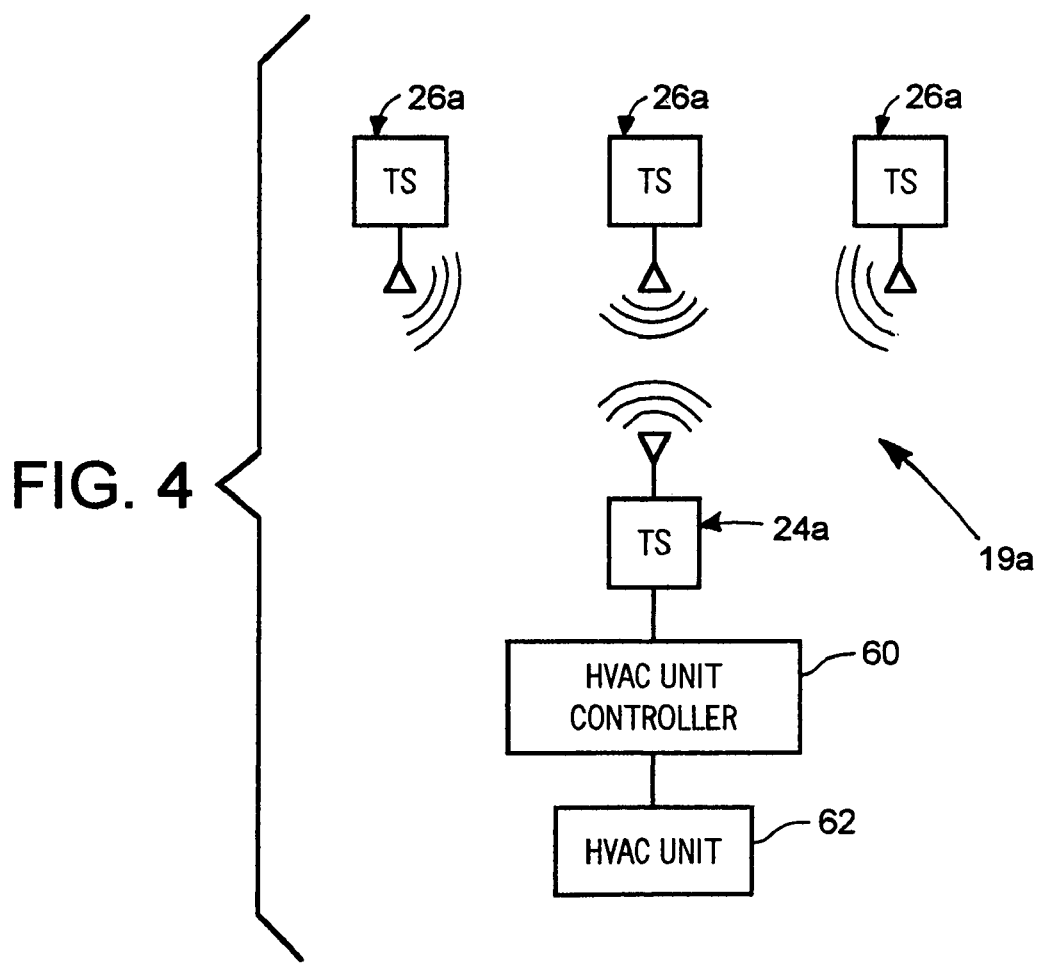
FIG. 4 is a schematic diagram showing an arrangement wherein multiple thermostats communicate by wireless or radio frequency signal transmission.

Referring briefly to FIG. 4, there is shown an alternate embodiment of the present invention comprising an air conditioning or HVAC system 19a where a thermostat 24a is connected directly to an HVAC unit controller 60 for controlling an air conditioning or HVAC unit 62 and thermostats 26a corresponding to the thermostats 26 are provided and include, respectively, radio frequency transmitter and receiver circuitry for communicating with a radio frequency transmitter and receiver unit included in the thermostat 24a. The arrangement of FIG. 4 may be utilized as a replacement system wherein the thermostat 24a is hard wired to the HVAC unit controller 60 but is in RF signal communication with multiple thermostats 26a. In this way a multiple thermostat system in accordance with the invention may be easily retrofitted into an existing building or residential dwelling without hard wiring between each of the thermostats and a master thermostat or between each of the thermostats and an HVAC unit controller.

Figure 5:
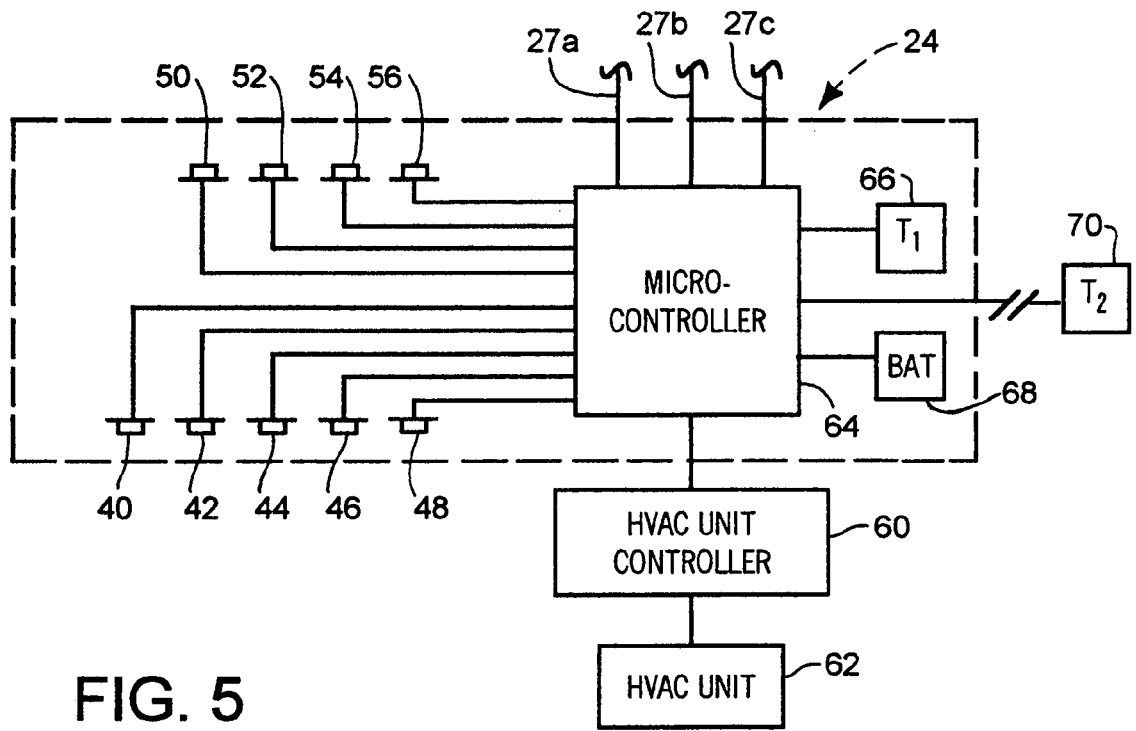
FIG. 5 is a block diagram of one of the thermostats of a multiple thermostat arrangement in accordance with the invention.

Referring now to FIG. 5, the thermostat 24 is illustrated in a block diagram and shown connected to the HVAC unit controller 60 for the HVAC unit 62. The thermostat 24 includes a programmable microcontroller 64 operably connected to a temperature sensor 66 for sensing the temperature of the space at which the thermostat 24 is located, such as the room 12, FIG. 1. Microcontroller 64 may receive power from HVAC unit controller 60 and may include a suitable battery power source as a backup, the battery power source being indicated at numeral 68. Still further, thermostat 24 may be suitably connected to an outdoor temperature sensor 70 whereby outdoor temperature may be sensed and reported to the thermostats 26. Alternatively, any one of the thermostats 26 may include an outdoor temperature sensor 70 for communicating that temperature to each of the other thermostats of the system 19. As further shown in FIG. 5, the microcontroller 64 is operably connected to each of the switch actuators 40, 42, 44, 46, 48, 50, 52, 54, and 56 for effecting control over the HVAC unit 62 in accordance with commands given by the respective switch actuators, or for displaying particular parameters of interest with respect to operation of the associated HVAC system 19. The microcontroller 64 is also adapted to receive signals from the respective thermostats 26 by way of suitable conductors 27a, 27b and 27c, see FIG. 3 also. The microcontroller 64 is programmable to carry out certain desired functions, including those described above, and including the functions of receiving signals from the respective thermostats 26 indicating the temperatures at the locations of the thermostats 26, and receiving a signal from a selected thermostat 26 that the HVAC unit controller and HVAC unit will be controlled from, upon actuation of the Control Here switch actuator for that thermostat. Of course, the microcontroller 64 may receive a signal from the key or switch actuator 56 of the thermostat 24 indicating that control will be in accordance with the temperatures and signals given from the thermostat 24. The microcontroller 64 may also operate to set the time displayed by the thermostat displays at the respective thermostats 24 and 26, as well as the setpoint temperature setting. For example, if a particular temperature is set at thermostat 24 this setpoint temperature will be shown on the display of the thermostats 24 and 26 upon appropriate actuation of the switch actuator 54 and the corresponding switch actuators for thermostats 26, for example.

Figure 6:
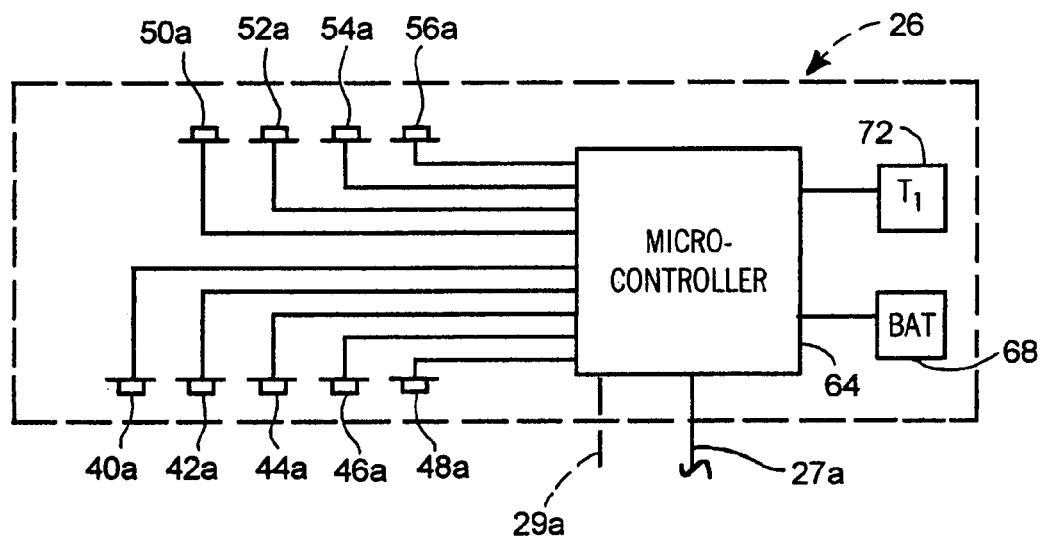
FIG. 6 is a block diagram of another one of the multiple thermostats for a multiple thermostat controlled HVAC system according to the invention.

Referring now to FIG. 6, there is illustrated a block diagram of one of the thermostats 26. Each of the thermostats 26 includes a microcontroller which may comprise a microcontroller 64, as indicated. However, the circuitry of the microcontrollers for the thermostats 26 may not be as complex nor the programming as involved as for the thermostat 24. On the other hand, all thermostats of the system 19 may be identical and be programmed to communicate with each other in accordance with the methods of the present invention. Referring further to FIG. 6, thermostat 26 includes a temperature sensor 72 for sending a suitable signal to the microcontroller 64 indicating the temperature at the location of the thermostat 26. Electrical power for powering the thermostats 26 may be communicated from thermostat 24 via wiring 27a, 27b and 27c, FIG. 3, or directly from the HVAC unit controller 60 via hard wiring, such as at 29a, 29b and 29c, FIG. 3. In addition, a battery power source 68 may be included in each of the thermostats 26 for backup purposes.

As mentioned previously, thermostats 26 may be identical to each other and identical to thermostat 24, although in the exemplary embodiment none of the thermostats 26 include an outdoor temperature sensor. However, each of the thermostats 26 includes an array of switch actuators for inputting signals to and reading information from their respective microcontrollers 64 and which preferably are identical to the arrangement of switch actuators for the thermostat 24. The keys or switch actuators and are indicated in FIG. 6 by numerals 40a, 42a, 44a, 46a, 48a, 50a, 52a, 54a and 56a. Accordingly, each of the thermostats 26 may be controlled in the same manner as the thermostat 24. For example, the temperature setting which controls the operation of the HVAC unit 62 may be that which is sensed by any one of the thermostats 26 if that thermostat is actuated to control the temperature from the location of that thermostat. Any subsequent signal input to a microcontroller of any one of thermostats 24 and 26 to switch the "Control Here" function from one thermostat to another will be in accordance with the last thermostat to be actuated in that respect. Moreover, the temperature setting for all thermostats 24 and 26 may be controlled from any one of the thermostats and the clock setting for all thermostats may be controlled by any one of the thermostats 24 and 26.

The microcontroller 64 may be of a type commercially available. The microcontrollers 64 of each of the thermostats 24 and 26 may be programmed to communicate with each other and to carry out the functions described herein. For example, each of the microcontrollers of the thermostats 26 may be programmed to sense the temperature at the location of each of the thermostats 26. The temperature sensors 66 and 72 communicate signals via their respective microcontrollers to the thermostat 24 whereby the microcontroller 64 of thermostat 24 may calculate an average value of temperature and use that temperature as the temperature setpoint for operation of the thermostats. The averaged temperature setpoint may then be communicated to the microcontrollers of all thermostats and a thermostat 24 or 26 which is actually in control will use that averaged temperature as its setpoint. Accordingly, the thermostat 24 or 26 which is in control of the HVAC unit 62 will cause the unit to function to provide conditioned air to all rooms or spaces including the space at which the controlling thermostat is located to hold the setpoint temperature.

As mentioned previously, any one of the thermostats 24 or 26 may be operated to change the temperature setpoint, cause the system to operate in the heating mode or the cooling mode, operate a fan of the HVAC unit only, display the outdoor temperature on a display associated with all thermostats or adjust the thermostat making the query. Each of the thermostats 24 and 26 may also be operated to set Daylight Saving Time or Standard Time by actuation of any one of the switch actuators 52 or 52a in accordance with a method of the invention. In this way, a multiple thermostat control system may be associated with a single HVAC controller and HVAC unit for controlling the conditioning of air in a space such as a multiroom residential dwelling unit 10 or other buildings which have various spaces at which temperature control is desired.

Figure 7:
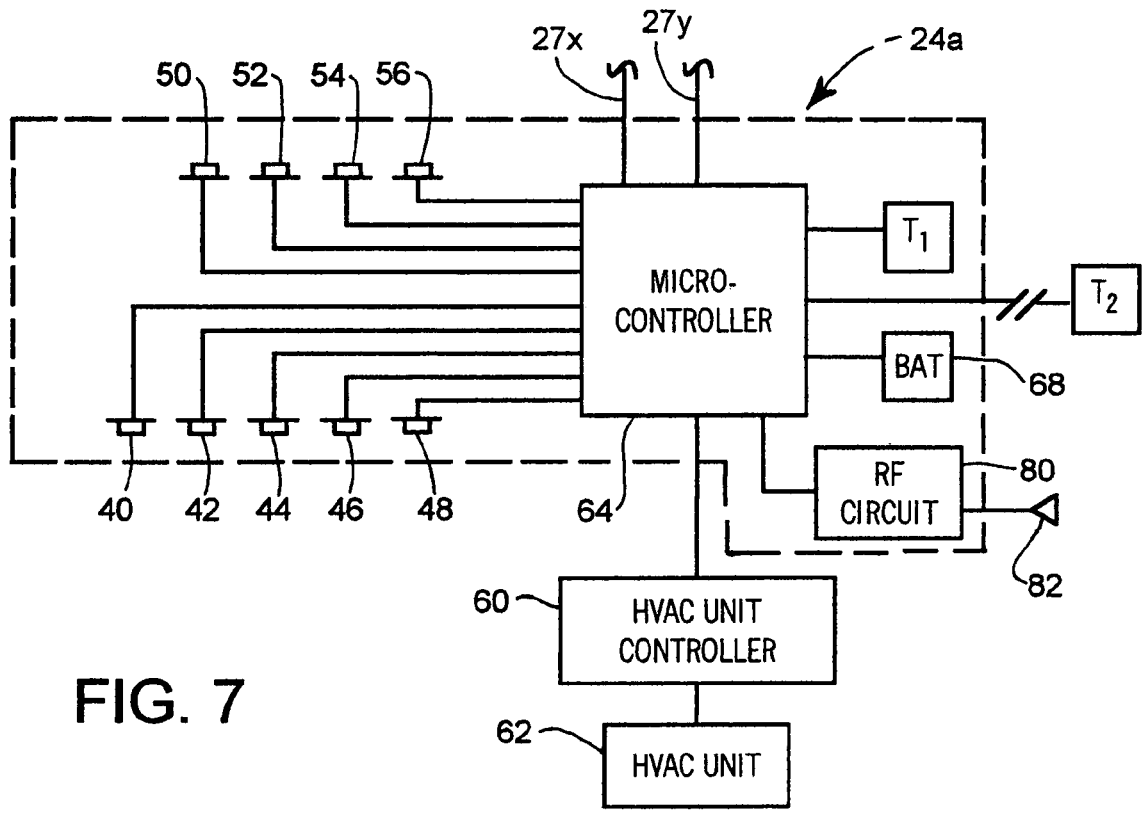
FIG. 7 is a schematic diagram of a thermostat operable to communicate with other thermostats of a multiple thermostat system by way of wireless or radio frequency signal transmission.

Referring now to FIG. 7, there is illustrated an alternate embodiment of thermostat 24, indicated by numeral 24a. Thermostat 24a is substantially like the thermostat 24 except that the microcontroller 64 of thermostat 24a is operably connected to a radio transceiver or radio frequency (RF) circuit, indicated generally by the numeral 80. The RF circuit 80 includes a suitable transmitting and receiving antenna arrangement 82 whereby the thermostat 24a may communicate with each of thermostats 26a, as shown by the schematic arrangement of FIG. 4. Typically, the thermostat 24a would be hard wired to the HVAC unit controller 60 but could communicate via suitable RF circuitry also. Thermostat 24a may communicate with a selected number of thermostats 26 via conductors 27x and 27y while communicating with one or more thermostats 26a via RF communication. Thermostat 24a is operable to receive power from the controller 60 for powering its RF circuit 80 as well as its microcontroller 64. However, a backup battery power source 68 is operable to power the thermostat 24a in a situation where needed. Accordingly, the thermostats 26a communicate directly with microcontroller 64 of thermostat 24a by way of the RF circuit 80 to carry out all of the functions described herein including those described for the system 19 shown in FIG. 3.

Figure 8:
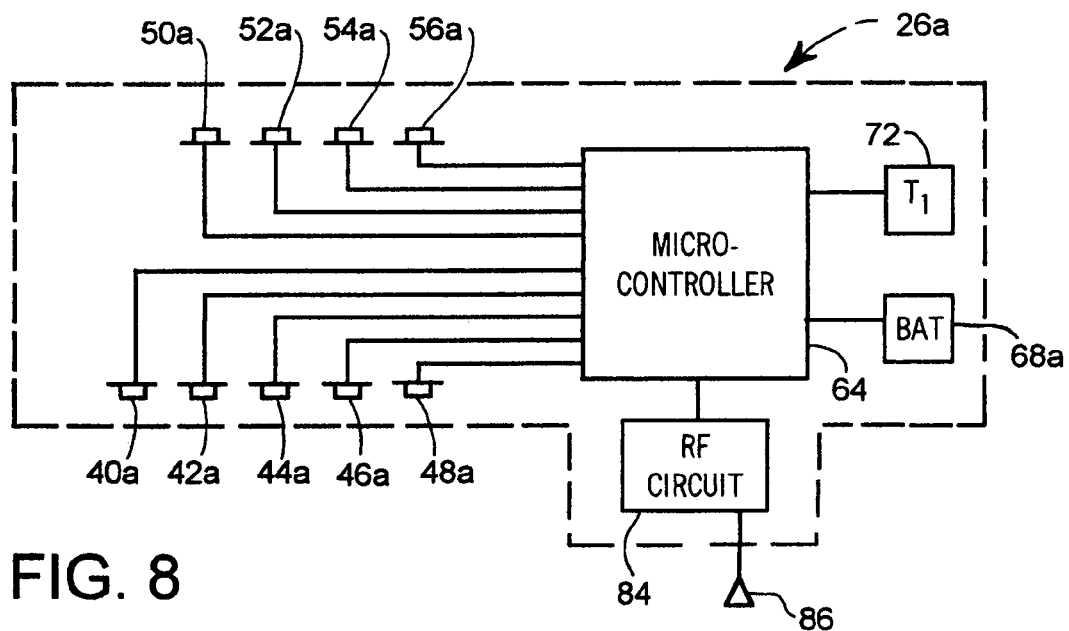
FIG. 8 is a block diagram of another thermostat for a multiple thermostat system wherein radio frequency signal transmission is provided.

Referring briefly to FIG. 8, one of the thermostats 26a is shown by an exemplary block diagram. Each of the thermostats 26a includes a microcontroller 64, a battery source of power 68a, a temperature sensor 72 and respective switch actuators 40a through 56a. In addition, each thermostat 26a includes a radio frequency transceiver or RF circuit 84 for communicating with the RF circuit 80 by way of a suitable antenna arrangement 86. Accordingly, each thermostat 26a is battery powered and communicates entirely via RF signals with the thermostat 24a for carrying out the same functions as described above and for which the thermostat 24 and 26 of the system 19 are capable. In other words, the HVAC system 19a of FIG. 4 functions substantially like the system 19 of FIG. 3. Moreover, the thermostat 24a may also be adapted to be hard wired to selected thermostats 26 whereby an HVAC system may be installed which has multiple thermostats which are in communication with each other via a combination of radio frequency or wireless signal transmission, as well as via hard wiring or conventional electrical conductors.

Accordingly, as described hereinbefore, the HVAC systems 19 and 19a may be operated in a manner whereby the thermostats of the respective systems communicate their sensed temperature to one of the microcontrollers of one of the thermostats which is configured to average the temperatures sensed by the respective thermostats and use that temperature for comparing with the setpoint of the thermostat which is presently controlling operation of the system, for example. Moreover, operation of any one of the thermostats of the systems 19 and 19a to change the clock setting of that thermostat will change the clock setting of all thermostats of the system. Still further, if the temperature setpoint for control of the temperature in the space controlled by the system 19 and 19a is set at any one of the thermostats, then the temperature setpoint of all thermostats is corrected to the new setting and operation of the associated HVAC unit 62 is controlled accordingly. Still further, one of the thermostats 24, 26, 24a or 26a of the respective systems 19 and 19a may be designated as the controlling thermostat by actuation of its respective Control Here switch actuator 56 or 56a, for example. Subsequent changes in the controlling thermostat may be made by actuation of the Control Here switch actuator 56 or 56a of any of the other thermostats of the system. Of course, any one of the other functions controllable by the switch actuators of any one of the thermostats may be carried out in the same manner. That is, whether the system is operating in the heating or cooling mode may be controlled by actuation of a switch actuator 50 or 50a. Operation of the system fan may be controlled from any one of the thermostats 24, 26, 24a or 26a and operation to set the thermostat clocks for Daylight Saving Time or Standard Time may be carried out for all thermostats by actuation of the DST switch actuator 52 or 52a. Actuation of switch actuator 52 or 52a to set Daylight Saving Time or so called Standard Time and to correct the setting, if carried out for one thermostat will automatically correct all thermostats in the respective systems 19 and 19a.

The microcontroller circuits for the thermostats 24, 24a, 26 and 26a may be programmed to provide for actuation of the Daylight Savings Time switch actuators 52 and 52a to show the correct correlation between the time set and display of the icon 34. In setting the clock for the thermostats 24, 24a, 26 and 26a, the time set may not be correlated in all instances with a showing of the icon 34. For example, a person may set the clock for Daylight Saving Time during the initial time setting procedure, which setting will not necessarily display the icon 34. Correction for correlation of the correct time setting and the display of the icon 34 can be done under one or more of the following procedures without reentering the clock setting mode.

For example, the microcontroller 64 may be programmed to follow the sequence that, when the switch actuators 52 or 52a are pressed a first time, the clock will advance one hour from the initial time setting and the icon 34 will be displayed and when pressed a second time the clock will be set back one hour from the initial setting and the icon will not be displayed. Accordingly, if the time is correctly set at 1:00 p.m., for example, and the icon 34 is not shown on the display, but the time is actually Daylight Saving Time, correction may be made by pressing the switch actuator 52 or 52a once to advance the time displayed to 2:00 p.m. with the icon 34 displayed, the switch actuator is then pressed a second time to set back the clock to 12:00 p.m. with the icon 34 not displayed. After waiting a predetermined period of time, such as ten seconds, the clock function has been reset and the preprogrammed sequence of actuations of switch actuators 52 or 52a may begin again. Accordingly, if the switch actuator 52 or 52a is pressed again it will advance the clock one hour to 1:00 p.m. and cause the icon 34 to be displayed in accordance with the sequence preprogrammed into the thermostat microcontroller for actuation of the DST switch actuator. As long as the switch actuators 52 or 52a are pressed more frequently than the ten second delay, they will follow the preprogrammed sequence of settings changes described above. However, when a switch actuator 52 or 52a is not actuated until after a certain time delay, ten seconds for example, the original sequence becomes effective upon successive actuations of the DST switch actuators 52 or 52a.

Accordingly, if the correct time is 1:00 p.m. and the DST icon 34 is shown but the time is actually Standard Time, a correction may be carried out by pressing the switch actuator 52 or 52a to advance the clock one hour to 2:00 p.m. and cause the icon 34 to be displayed. An additional keystroke or actuation of switch actuator 52 or 52a is not made until ten seconds elapses. The additional keystroke is then caused to occur which again advances the clock one hour and leaves the icon 34 displayed. However, if the switch actuator 52 or 52a is actuated a second time within the ten second period, the clock will set back one hour from the initial setting (2:00 p.m.) and the icon 34 will be extinguished, the time now showing as 1:00 p.m. and the icon is not shown, which is the correct status of the thermostat clock.

Another embodiment of a method for correcting the setting of the thermostat clock and the icon 34 may be wherein a first actuation of a switch actuator 52 or 52a will set the clock back one hour from the initial setting and extinguish the icon 34 followed by a second press of the switch actuator which will advance the clock one hour from the initial setting and display the icon 34. With this sequence of operation of the DST switch actuators 52 or 52a, if the current time is Daylight Saving Time but the icon is not shown and if the correct time shown is 1:00 p.m. actuation of the DST switch actuator will set the clock back one hour and extinguish the icon 34. After waiting ten seconds to let the time become set at 12:00 p.m. with the icon 34 extinguished, the DST switch actuator 52 or 52a is then pressed twice within the ten second interval, the first press (actuation) setting the time back one hour to 11:00 a.m. with the DST icon extinguished or off and the next press setting the time forward one hour (from 12:00 p.m.) with the DST icon now in the on condition. The correct time is now set at 1:00 p.m. and the correct icon setting is provided.

In another method in accordance with the second embodiment of the time and icon setting process it is contemplated that, if the time of 1:00 p.m. is correct at Standard Time but the DST icon 34 is shown in the "on" or displayed condition, the procedure would be to press the DST switch actuator 52 or 52*a* a first time to set the time back one hour from the initial setting with the DST icon now off, then press the DST switch actuator again, within the ten second interval, to advance the clock one hour (to 2:00 p.m.) with the DST icon 34 now on. At this point, the procedure would be to wait the predetermined ten-second interval to let the new setting establish itself on the thermostat clock. After the ten second interval, the DST switch actuator 52 or 52*a* would be pressed once to set the clock back one hour to 1:00 p.m. with the icon 34 off, which is the correct setting.

The sequence of operations or actuations of the switch actuators 52 or 52*a* may also be combined in other methods for correcting the correlation between the time setting and the display of the icon 34. For example, assume that the time is correctly set at 1:00 p.m. and Daylight Saving Time is in effect but the icon 34 is not shown on the display. A sequence of actuations of a DST switch actuator 52 or 52*a* may be as follows. In a first actuation the time is advanced one hour from the initial setting and the icon 34 is displayed, in a second actuation the time displayed is set back one hour from the initial setting and the icon 34 is off, in a third actuation the time displayed is reset to the original and correct time setting (1:00 p.m.) and the icon 34 is off. In a fourth actuation of the DST switch actuator 52 or 52*a*, the time is advanced one hour to 2:00 p.m. and the icon 34 is displayed, in a fifth step the time is set back one hour from the initial setting to 12:00 p.m. and the icon is extinguished and in a sixth actuation the time is reset to the initial setting and the icon 34 is displayed.

Another combination of steps may be carried out if the time displayed is correctly set at 1:00 p.m., the DST icon 34 is displayed but it is the time of year when Standard Time is in effect. In this situation the system may be programmed to provide a first through sixth actuation of a switch actuator 52 or 52*a* as follows. The time is set back one hour from the initial setting and the icon 34 is turned off, the time is then advanced one hour from the initial setting and the icon is displayed. The third actuation results in the time being returned to the original setting (1:00 p.m.) with the icon 34 "displayed" incorrectly. The above three steps are supplemented by fourth, fifth and sixth actuations which result in the time being set back one hour and the icon 34 extinguished in the fourth actuation followed by a fifth actuation where the time is advanced one hour from the initial setting and the icon is displayed and, finally, in a sixth actuation, the time is returned to the initial setting (1:00 p.m.) and the icon 34 is not displayed thereby resulting in the correct setting.

Still further combinations of actuations of the switch actuator 52 or 52*a* may be as follows. Again, the current correct time is 1:00 p.m., for example, Daylight Saving Time is in effect but the icon 34 is not shown on the display. A first actuation of the DST switch actuator 52 or 52*a* sets the clock back one hour from the initial setting and the icon 34 remains off, a second actuation results in advancing the clock one hour from the initial setting and the icon 34 is displayed. A third actuation returns the time displayed to the original and correct setting with the icon 34 not displayed. A fourth actuation results in the clock being set back one hour (from 1:00 p.m. to 12:00 p.m.) with the icon 34 extinguished. Fifth and sixth actuations of the DST switch actuator 52 or 52*a* will first advance the clock setting one hour from the original 1:00 p.m. setting with a DST icon displayed and finally a sixth actuation will return the clock setting to the correct time of 1:00 p.m. and the icon 34 will be displayed, which is the correct relationship.

Still further, the following sequence of steps may be carried out to correct a condition wherein the correct time is 1:00 p.m., Standard Time is in effect but the DST icon 34 is shown. In a first actuation of a switch actuator 52 or 52*a*, the clock is advanced one hour and the icon 34 is displayed. In a second actuation, the clock is set back one hour from the initial setting (from 1:00 p.m. to 12:00 p.m.) and the icon 34 is extinguished. A third actuation of the DST icon results in the clock returning to the original setting of 1:00 p.m. in Standard Time but the icon showing incorrectly. Fourth, fifth and sixth actuations of the DST switch actuator 52 or 52*a* will result in the clock being advanced one hour (to 2:00 p.m.) with the icon being displayed, the clock then being set back one hour from the initial setting and extinguishment of the icon 34, followed by the final actuation wherein the clock is returned to its original correct setting of 1:00 p.m. and the icon is extinguished thereby establishing the proper correlation.

Although preferred embodiments of multiple thermostat controlled air conditioning or HVAC systems have been disclosed herein together with methods of operating same, those skilled in the art will appreciate that various substitutions and modifications may be made to the systems and methods of the invention without departing from the scope and spirit of the appended claims.

What is claimed is:

1. An air conditioning system including multiple thermostats disposed at predetermined locations throughout a building defining enclosed spaces and for controlling an air conditioning unit, said multiple thermostats each including a temperature display and switch actuators for setting a temperature setpoint, said multiple thermostats including control circuits, respectively, operably in communication with each other such that changing a temperature setpoint at any one of said multiple thermostats will change the temperature setpoint of all of said thermostats wherein each of said multiple thermostats include a Control Here switch actuator operable to effect control of said air conditioning unit to control the temperature in accordance with the temperature setpoint at the thermostat at which the Control Here switch actuator has been most recently actuated and to control the temperature in response to a temperature sensed by the thermostat at which the Control Here switch actuator has been most recently actuated.

2. The system set forth in claim 1 wherein:
said multiple thermostats each include a radio frequency transmitter and receiver and said multiple thermostats communicate with each other via radio frequency signal transmission.

3. The system set forth in claim 1 wherein:
at least one of said multiple thermostats is configured to receive signals indicating the temperature sensed at selected ones of others of said multiple thermostats and said at least one thermostat includes control circuitry operable to determine an average temperature sensed by said others of said thermostats and said system is controlled to satisfy the demand for one of heating and cooling said spaces based on said average sensed temperature as a setpoint.

4. The system set forth in claim 1 wherein:
at least selected ones of said multiple thermostats include a clock and a visual display of time recorded by said clock, said selected ones of said thermostats include switch actuators for setting a time displayed and means operable upon changing the time displayed by one of said thermostats to effect a change in the time displayed by each of said selected ones of said thermostats having said time display.

5. The system set forth in claim 1 wherein:
said multiple thermostats are configured to display a temperature setpoint set by any one of others of said multiple thermostats upon changing the setpoint of one of said multiple thermostats.

6. The system set forth in claim 1 wherein:
at least a selected one of said multiple thermostats include a time display, a Daylight Saving Time icon, and a Daylight Saving Time switch actuator for changing at least one of a time setting function of said at least one thermostat and said time display in accordance with selection of Daylight Saving Time or Standard Time by actuation of said Daylight Saving Time switch actuator.

7. The system set forth in claim 1 wherein:
at least one of said multiple thermostats is configured to receive signals indicating the temperature sensed at selected ones of others of said multiple thermostats and said at least one thermostat includes control circuitry operable to determine an average temperature sensed by said others of said thermostats and said system is controlled to satisfy the demand for one of heating and cooling said spaces based on said average sensed temperature as a setpoint.

8. The system set forth in claim 1 wherein:
at least selected ones of said multiple thermostats include a clock and a visual display of time recorded by said clock, said selected ones of said thermostats include switch actuators for setting a time displayed and means operable upon changing the time displayed by one of said thermostats to effect a change in the time displayed by each of said selected ones of said thermostats having said time display.

9. The system set forth in claim 1 wherein:
said multiple thermostats are configured to display a temperature setpoint set by any one of others of said multiple thermostats upon changing the setpoint of one of said multiple thermostats.

10. A method for controlling operation of an air conditioning system for providing conditioned air to enclosed spaces, said system including multiple thermostats disposed in selected ones of said enclosed spaces and operably connected to said system for controlling the temperature in said enclosed spaces, respectively, said multiple thermostats each including a temperature sensor and a display for displaying the temperature sensed, a setpoint temperature and the time of day, and a Control Here switch actuator actuating a Control Here switch actuator of one of said thermostats to cause said system to satisfy a temperature setpoint of said one thermostat in response to a temperature sensed by said one thermostat and said multiple thermostats being operably connected to each other by one of electrical conductors and radio frequency signal transmission, said method including the steps of:
sensing temperatures in said enclosed spaces by respective ones of said multiple thermostats, communicating the sensed temperatures between selected ones of said multiple thermostats, providing at least one of said thermostats with a microcontroller, conducting signals corresponding to said sensed temperatures to said at least one thermostat, determining an average sensed temperatures by said microcontroller and causing said system to satisfy said average temperature as a setpoint temperature for said multiple thermostats.

11. The method set forth in claim 10 wherein:
at least selected ones of said thermostats include switch actuators for setting a setpoint temperature to be displayed by said thermostats, respectively, whereby setting a setpoint temperature by any one of said thermostats causes said setpoint temperature to be displayable on at least selected others of said thermostats.

12. The method set forth in claim 10 wherein:
at least selected ones of said thermostats include switch actuators for setting a setpoint temperature to be displayed by said thermostats, respectively, whereby setting a setpoint temperature by any one of said thermostats causes said setpoint temperature to be displayable on at least selected others of said thermostats.

13. The method set forth in claim 10 wherein:
at least selected ones of said thermostats include a clock, a time display and at least one clock setting switch actuator and said method includes the steps of setting the time at one of said thermostats and displaying the same time setting at others of said thermostats.

14. A method for controlling operation of an air conditioning system for providing conditioned air to enclosed spaces, said system including multiple thermostats disposed in selected ones of said enclosed spaces and operably connected to said system for controlling the temperature in said enclosed spaces, respectively, said multiple thermostats each including a temperature sensor and a display for displaying the temperature sensed, a setpoint temperature and the time of day, and said multiple thermostats being operably connected to each other by one of electrical conductors and radio frequency signal transmission, at least selected ones of said thermostats including a clock, a time display and at least on clock setting switch actuator said method including the steps of:
sensing temperatures in said enclosed spaces by respective ones of said multiple thermostats, communicating the sensed temperatures between selected ones of said multiple thermostats, providing at least one of said thermostats with a microcontroller, conducting signals corresponding to said sensed temperatures to said at least one thermostat, determining an average sensed temperatures by said microcontroller and causing said system to satisfy said average temperature as a setpoint temperature for said multiple thermostats; and
setting the time at one of said thermostats and displaying the same time setting at others of said thermostats.

15. A method for controlling operation of an air conditioning system for providing conditioned air to enclosed spaces, said system including multiple thermostats disposed in selected ones of said enclosed spaces and operably connected to said system for controlling the temperature in said enclosed spaces, respectively, said multiple thermostats each including a temperature sensor and a display for displaying the temperature sensed, a setpoint temperature and the time of day, and said multiple thermostats being operably connected to each other by one of electrical conductors and radio frequency signal transmission, said method including the steps of:
sensing temperatures in said enclosed spaces by respective ones of said multiple thermostats, communicating the sensed temperatures between selected ones of said multiple thermostats, providing selected ones of said thermostats with a Daylight Saving Time switch actuator operable to advance an initial clock setting one hour and display a Daylight Saving Time icon, and correcting a discrepancy between a time shown on a display and the display or lack thereof of said icon by:
actuating one of said Daylight Saving Time switch actuators a first time to advance the time displayed one hour from the initial time setting and to display said icon;

actuating said Daylight Saving Time switch actuator a second time to set back the time displayed one hour from said initial time setting and extinguish said icon; and actuating said Daylight Saving Time switch actuator a third time to set the correct time and display said icon.

16. The method set forth in claim 15 wherein:

the step of actuating said Daylight Saving Time switch actuator a third time is delayed a predetermined amount of time after actuation of said Daylight Saving Time switch actuator a second time.

17. A method for controlling operation of an air conditioning system for providing conditioned air to enclosed spaces, said system including multiple thermostats disposed in selected ones of said enclosed spaces and operably connected to said system for controlling the temperature in said enclosed spaces, respectively, said multiple thermostats each including a temperature sensor and a display for displaying the temperature sensed, a setpoint temperature and the time of day, and said multiple thermostats being operably connected to each other by one of electrical conductors and radio frequency signal transmission, said method including the steps of:

sensing temperatures in said enclosed spaces by respective ones of said multiple thermostats, communicating the sensed temperatures between selected ones of said multiple thermostats, providing at least one of said thermostats with a microcontroller, conducting signals corresponding to said sensed temperatures to said at least one thermostat, determining an average sensed temperatures by said microcontroller, causing said system to satisfy said average temperature as a setpoint temperature for said multiple thermostats; and providing selected ones of said thermostats with a Daylight Saving Time switch actuator operable to set back an initial clock setting one hour and extinguish a Daylight Saving Time icon, and correcting a discrepancy between a time shown on a display and the display or lack thereof of said icon by:

actuating one of said Daylight Saving Time switch actuators a first time to set back the time displayed one hour from an initial time setting and to extinguish said icon;

actuating said Daylight Saving Time switch actuator a second time to advance the time displayed one hour from said initial time setting and display said icon; and actuating said Daylight Saving Time switch actuator a third time to set the correct time and extinguish said icon.

18. The method set forth in claim 17 wherein:

actuation of said Daylight Saving Time switch actuator said third time is delayed a predetermined time from actuation of said Daylight Saving Time switch actuator said second time.

19. A method for controlling operation of an air conditioning system for providing conditioned air to enclosed spaces, said system including multiple thermostats disposed in selected ones of said enclosed spaces and operably connected to said system for controlling the temperature in said enclosed spaces, respectively, said multiple thermostats each including a temperature sensor and a display for displaying the temperature sensed, a setpoint temperature and the time of day, and said multiple thermostats being operably connected to each other by one of electrical conductors and radio frequency signal transmission, said method including the steps of: sensing temperatures in said enclosed spaces by respective ones of said multiple thermostats and communicating the sensed temperatures between selected ones of said multiple thermostats wherein:

each of said thermostats include a Control Here switch actuator and said method includes actuating a Control Here switch actuator of one of said thermostats to cause said system to satisfy a temperature setpoint of said one thermostat.

20. An air conditioning system including multiple thermostats disposed at predetermined locations throughout a building defining enclosed spaces and for controlling an air conditioning unit, said multiple thermostats each including a temperature display and switch actuators for setting a temperature setpoint, said multiple thermostats including control circuits, respectively, operably in communication with each other:

at least one of said multiple thermostats includes a time display, a Daylight Saving Time icon, and a Daylight Saving Time switch actuator for changing at least one of a time setting function and a time display of all of said thermostats in accordance with selection of Daylight Saving Time or Standard Time by actuation of said Daylight Saving Time switch actuator wherein the Daylight Saving Time switch actuator is operable to set back an initial clock setting one hour and extinguish a Daylight Saving Time icon, and to correct a discrepancy between a time shown on a display and the display or lack thereof of said icon by: actuating one of said Daylight Saving Time switch actuators a first time to set back the time displayed one hour from an initial time setting and to extinguish said icon; actuating said Daylight Saving Time switch actuator a second time to advance the time displayed one hour from said initial time setting and display said icon; and actuating said Daylight Saving Time switch actuator a third time to set the correct time and extinguish said icon.

21. The system set forth in claim 20 wherein:

said multiple thermostats each include a radio frequency transmitter and receiver and said multiple thermostats communicate with each other via radio frequency signal transmission.

22. The system set forth in claim 20 wherein:

each of said multiple thermostats include a Control Here switch actuator operable to effect control of said air conditioning unit to control the temperature in accordance with the temperature setpoint at the thermostat at which the Control Here switch actuator has been most recently actuated.

* * * * *

UNITED STATES PATENT AND TRADEMARK OFFICE
CERTIFICATE OF CORRECTION

PATENT NO. : 7,600,694 B2
APPLICATION NO. : 10/765634
DATED : October 13, 2009
INVENTOR(S) : Helt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1418 days.

Signed and Sealed this

Fifth Day of October, 2010

David J. Kappos
*Director of the United States Patent and Trademark Office*